United States Patent
Kranz et al.

(10) Patent No.: US 6,553,424 B1
(45) Date of Patent: Apr. 22, 2003

(54) CIRCULAR BUFFER FOR A TDMA DATA TRANSMISSION STATION AND CORRESPONDING DATA TRANSMISSION STATION

(75) Inventors: Christian Kranz, Ratingen Lintorf (DE); Ulrich Bötzel, Kaarst (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/160,877

(22) Filed: Sep. 25, 1998

(30) Foreign Application Priority Data

Sep. 25, 1997  (DE) .......................... 197 42 378

(51) Int. Cl.⁷ ........................... G06F 15/16; H04Q 7/00
(52) U.S. Cl. ....................................... 709/234; 370/330
(58) Field of Search ............................. 370/280, 294, 370/321, 915, 330; 709/234

(56) References Cited

U.S. PATENT DOCUMENTS

| | | | | |
|---|---|---|---|---|
| 3,938,105 A | * | 2/1976 | Lechner ..................... | 360/48 |
| 4,939,652 A | * | 7/1990 | Steiner ................... | 364/424.04 |
| 5,237,570 A | * | 8/1993 | Smolinske et al. ......... | 370/348 |
| 5,297,142 A | * | 3/1994 | Paggeot et al. ............ | 340/825.5 |
| 5,333,296 A | * | 7/1994 | Bouchard et al. .......... | 395/425 |
| 5,337,295 A | * | 8/1994 | Maeda ........................ | 360/32 |
| 5,416,778 A | * | 5/1995 | Chan et al. ................ | 370/330 |
| 5,566,168 A | * | 10/1996 | Dent ......................... | 370/323 |
| 5,602,988 A | * | 2/1997 | Haulin ....................... | 711/100 |
| 5,664,153 A | * | 9/1997 | Farrell ...................... | 711/104 |
| 5,732,076 A | * | 3/1998 | Ketseoglou et al. ........ | 370/347 |
| 5,751,951 A | * | 5/1998 | Osborne et al. ............ | 709/250 |
| 5,822,313 A | * | 10/1998 | Malek et al. ............... | 370/332 |
| 5,838,746 A | * | 11/1998 | Bellec ........................ | 375/365 |
| 5,838,922 A | * | 11/1998 | Galand et al. .............. | 370/412 |
| 5,923,654 A | * | 7/1999 | Schnell ....................... | 370/390 |
| 5,935,214 A | * | 8/1999 | Stiegler et al. .............. | 370/330 |
| 6,011,785 A | * | 1/2000 | Carney et al. ............... | 370/330 |
| 6,023,453 A | * | 2/2000 | Ruutu et al. ................ | 370/229 |
| 6,272,121 B1 | * | 8/2001 | Smith et al. ................ | 370/277 |
| 6,377,562 B1 | * | 4/2002 | Schneider ................... | 370/330 |
| 6,393,002 B1 | * | 5/2002 | Paneth et al. ............... | 370/330 |
| 6,393,515 B1 | * | 5/2002 | Pollack et al. .............. | 370/277 |
| 2002/0021679 A1 | * | 2/2002 | Paneth et al. ............... | 370/337 |
| 2002/0034171 A1 | * | 3/2002 | Smith et al. ................ | 370/321 |

FOREIGN PATENT DOCUMENTS

| | | |
|---|---|---|
| DE | 42 92 401 C1 | 2/1993 |
| DE | 42 92 402 C1 | 2/1993 |
| DE | 42 36 774 C2 | 5/1994 |
| DE | 44 31 334 A1 | 8/1995 |
| DE | 44 35 130 A1 | 4/1996 |
| WO | WO 96/38991 | 12/1996 |

OTHER PUBLICATIONS

DECT–Technology, Applications and Implementations, Hendy, IEEE.com, pp. 1–4, 1995.*
U. Tietze et al.: "Halbleiter–Schaltungstechnik" [semiconductor circuit technology], Springer Verlag, Berlin, 7th ed., 1985, pp. 288–293.

* cited by examiner

Primary Examiner—Robert B. Harrell
Assistant Examiner—Bunjob Jaroenchonwanit
(74) Attorney, Agent, or Firm—Laurence A. Greenberg; Werner H. Stemer; Ralph E. Locher

(57) ABSTRACT

A circular buffer for a TDMA data transmission station temporarily stores digital transmit data occurring over a number of time slots in the transmission station and to be transmitted during a subsequent transmit time slot, and temporarily stores digital receive data received by the transmission station during a receive time slot and to be processed by it in a number of subsequent time slots. A TDMA data transmission station having a circular buffer is also provided.

8 Claims, 2 Drawing Sheets

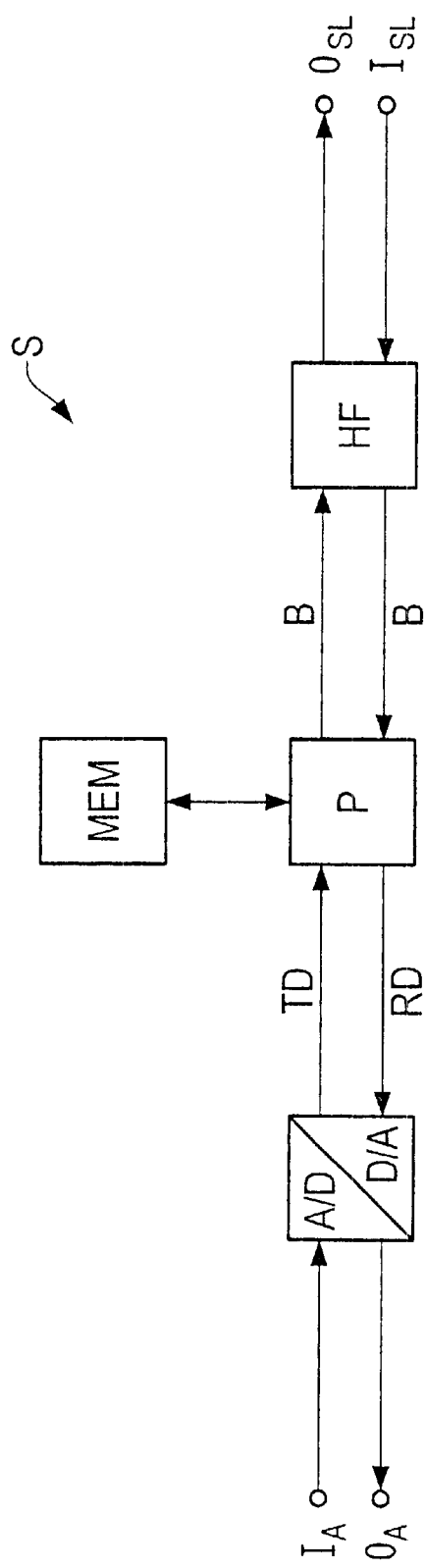
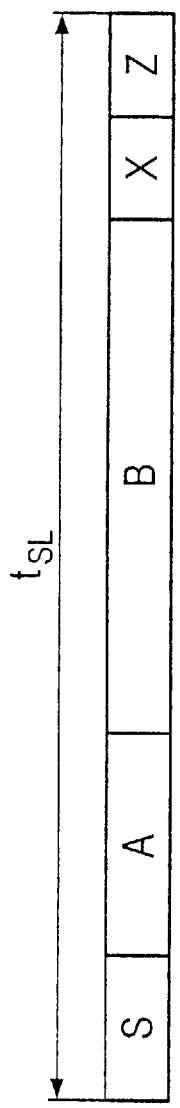

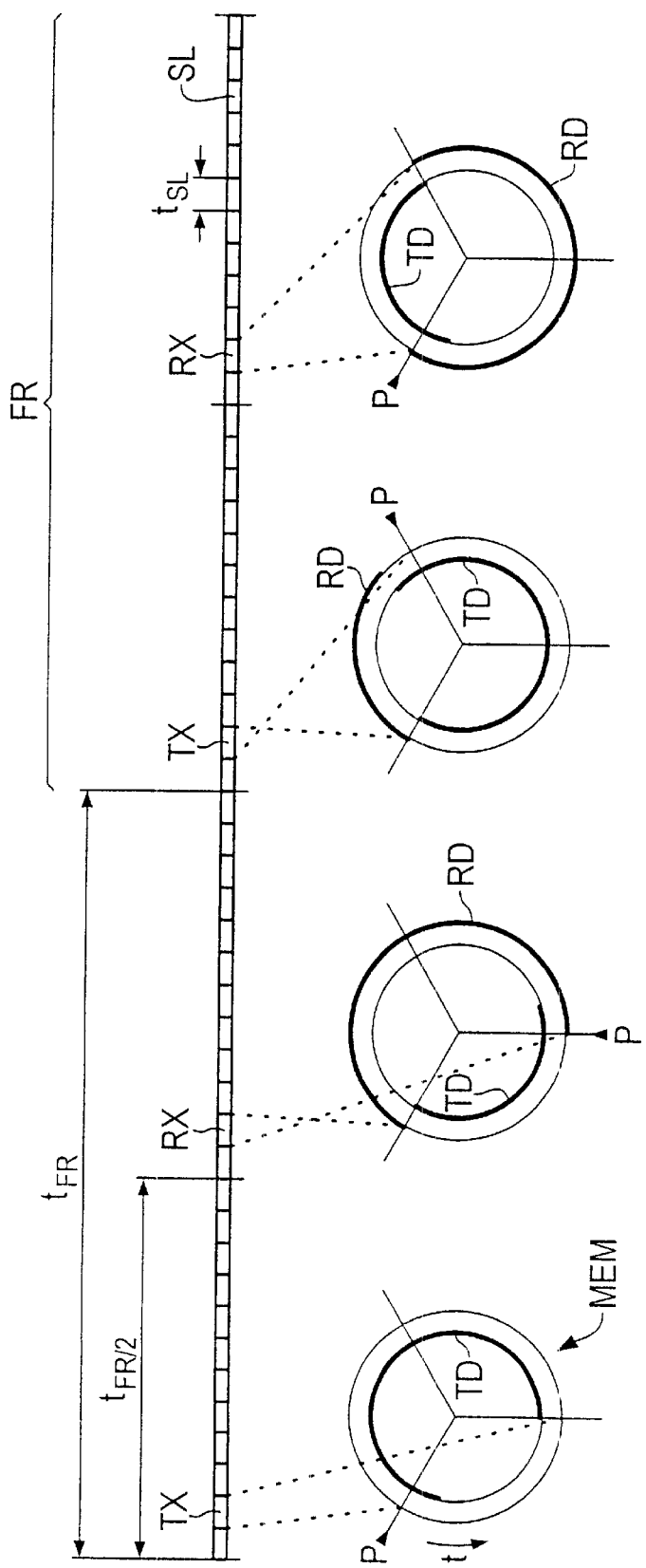

CIRCULAR BUFFER FOR A TDMA DATA TRANSMISSION STATION AND CORRESPONDING DATA TRANSMISSION STATION

BACKGROUND OF THE INVENTION

Field of the Invention

The invention relates to a circular buffer for a TDMA data transmission station and a TDMA data transmission station having a circular buffer.

In example of a TDMA (Time Division Multiple Access) data transmission system is the DECT (Digital Enhanced Cordless Telephone) system. In TDMA systems, data transmission in time division multiplex occurs during so-called time slots. The composition of data transmitted during a DECT time slot is described in detail below in conjunction with FIG. 3. Such devices are quite complex.

SUMMARY OF THE INVENTION

It is accordingly an object of the invention to provide a circular buffer for a TDMA data transmission station ana a corresponding data transmission station, which overcome the hereinafore-mentioned disadvantages of the heretofore-known devices of this general type and which enable data transmitted in bursts but occurring or to be processed continuously in a TDMA data transmission station to be temporarily stored with the least possible complexity.

With the foregoing and other objects in view there is provided, in accordance with the invention, a single circular buffer for a TDMA data transmission station, comprising temporary storage for both digital transmit data occurring during a number of time slots in the transmission station and to be transmitted during a subsequent transmit time slot, and digital receive data received by the transmission station during a receive time slot and to be processed by it in a number of subsequent time slots.

A singular circular buffer for temporarily storing both transmit and receive data has the advantage that the configuration of the transmission station is simplified and the total storage required for storing the receive and transmit data can even be reduced as compared with separate buffers.

In accordance with another feature of the invention, the number of transmit data to be transmitted during a transmit time slot is just as large as the number of receive data to be received by the transmission station during a receive time slot, and the storage capacity of the circular buffer is 1.5 times that number.

In accordance with a further feature of the invention, receive data temporarily stored in the circular buffer during a receive time slot are overwritten, in an order in which they have been temporarily stored, by transmit data to be transmitted in a subsequent transmit time slot.

In accordance with an added feature of the invention, the circular buffer is provided for a DECT data transmission station and the respective transmit and receive data are user data of B fields which are transmitted within one DECT time slot each. A B field contains 40 bytes user data. The circular buffer according to the invention therefore has a storage capacity of only 60 bytes instead of the 80 bytes required with two separate buffers. The reduction of the storage requirement of the common circular buffer is based on the finding that the respective transmit and receive data are transmitted at different times and thus all bits of a B field only need to be temporarily stored during one transmit time slot for the transmit data and only during one receive time slot for the receive data while the other type of data in each case has a maximum storage requirement of 20 bytes at the same time.

With the objects of the invention in view there is also provided a TDMA data transmission station, comprising the circular buffer, in which a change of the receive time slot is immediately followed by a change of the transmit time slot, unless the transmit time slot has already changed directly before the change of the receive time slot.

This measure ensures that even with the minimum storage capacity of the circular buffer of 1.5 times the number of data to be respectively transmitted or received during a time slot, no data are lost during a time slot change (hand-over).

Other features which are considered as characteristic for the invention are set forth in the appended claims.

Although the invention is illustrated and described herein as embodied in a circular buffer for a TDMA data transmission station and a corresponding data transmission station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a block circuit diagram of an exemplary embodiment of a DECT data transmission station according to the invention;

FIG. 2 is an illustration of an exemplary embodiment of a circular buffer according to the invention, the occupancy of which is shown at four different times; and FIG. 3 is an illustration of a DECT time slot.

DESCRIPTION OF THE PREFERRED EMBODIMENTS

Referring now to the figures of the drawings in detail and first, particularly, to FIG. 3 thereof, there is seen a composition of data transmitted during a DECT time slot. The time slot has a length $t_{SL}$ and exhibits an S field containing synchronization data, an A field containing protocol data, a B field containing actual user data and an X field and a Z field which are used for error detection and correction of the transmitted data. Twenty-four of these time slots form a DECT frame. Twelve successive time slots of the frame are provided in each case for a data transmission in one direction and a remaining twelve are provided for a data transmission in the other direction.

In the case of a DECT telephone system, the user data transmitted in the B field are voice data of a telephone conversation. The voice data occur continuously during the conversation. However, the transmission of those data takes place in bursts in a transmit time slot. That is why a buffer is required in a DECT data transmission station for temporarily storing the transmit data, occurring continuously, which are only transmItted with the next transmit time slot. Similarly, a further buffer is necessary for temporarily storing data of the B field received in bursts during a receive time slot, which subsequently are again read out continuously from the buffer and are converted into acoustic signals. As a rule, the two buffers are constructed as circular buffers and have a storage capacity which matches the number of bytes of a B field. A B field has 40 bytes so that conventional DECT systems contain two buffers having 40 bytes storage capacity each.

FIG. 1 is a basic diagram showing those components of a DECT data transmission station S which are needed for understanding the invention. Voice data are continuously present at an analog input $I_A$. These data are digitized by an A/D converter and supplied as digital transmit data TD to a processor P which temporarily stores them in a circular buffer MEM. The temporarily stored transmit data TD are read out of the circular buffer MEM again by the processor P during a transmit time slot and are forwarded to a transceiver HF in the form of a B field B of the transmit time slot. The transceiver HF uses the transmit data TD to modulate a radio-frequency carrier frequency and outputs it to an output $O_{SL}$. Furthermore, receive data RD which have arrived in the form of a B field 3 at an input is of the transceiver HF during a receive time slot are demodulated by the transceiver HF and supplied to the processor P. The receive data RD are also temporarily stored in the circular buffer MEM by the processor P. Subsequently, the processor P continuously reads out the temporarily stored receive data from the circular buffer MEN and outputs them through a D/A converter to an analog voice output $O_A$.

Only the respective generation and processing of a B field of respective DECT transmit and receive time slots have been explained with respect to FIG. 1. The S, A, X and Z fields are respectively generated and processed in the same way as in conventional DECT transmission stations, which is why they will not be discussed further herein.

The DECT data transmission station S shown in FIG. 1 can be a DECT mobile unit or a DECT base station, for example.

In the text that follows, FIG. 2 will be used to explain the operation of the circular buffer MEM according to the invention. An upper part of FIG. 2 shows two successive DECT frames FR. Each DECT frame FR has a period $t_{FR}$ of 10 ms. The DECT frame FR is subdivided into twenty-four time slots SL having a period $t_{SL}$ of 417 μs in each case. In the case considered herein, one of the first twelve time slots SL of each frame FR is a transmit time slot TX during which transmit data TD are transmitted. One of the last twelve time slots SL of each frame FR is a receive time slot RX during which the transmission station S receives receive data RD. As long as there is no change of the time slot, in each case the transmit time slot TX is always the second time slot SL of the frame FR in the example considered. In principle, the receive time slot RX is offset by a half frame length as compared with the transmit time slot TX, unless the time slots are currently being changed.

In the lower part of FIG. 2, the memory loading of the circular buffer MEM is shown in each case for the two transmit time slots TX and the two receive time slots RX of the two frames FR shown. In each case, a buffer pointer P is drawn which points to the current storage location of the buffer MEM in each case. For the sake of better clarity, transmit data TD temporarily stored in the circular buffer MEM have been shown on an inner circle and temporarily stored receive data RD have been shown on an outer circle. During the operation of the circular buffer MEM, the pointer P circulates counterclockwise with time t. One circulation of the pointer P by 360° in the representation according to FIG. 2 means that it has passed through all storage locations of the circular buffer MEM. The circular buffer MEM has a storage capacity of 60 bytes. The three lines which are disposed at an angle of 120° to each other in each case are aids which are used for better orientation when considering FIG. 2.

Only the user data of the B field of the respective receive and transmit time slot TX are temporarily stored in the circular buffer MEM. They contain all of the voice information to be transmitted. These are 40 bytes per B field.

The four states of the circular buffer MEM shown in FIG. 2 are explained in detail in the text which follows. The illustration of the circular buffer MEM on the very left in FIG. 2 shows its state durIng the first transmit time slot TX. At the beginning of the transmit time slot TX, the circular buffer MEM already contains 40 bytes of transmit data TD written into it continuously by the processor P during the last 10 ms. These are the data which occupy two thirds of the circular buffer MEM to the right of the pointer P. During the transmit time slot TX being considered, these transmit data TD are read out of the circular buffer MEM by the processor P and transferred to the transceiver HF for transmission. These transmit data TD are subsequently no longer needed and can be overwritten. However, at the end of the transmit tIme slot TX, not only have the 40 bytes of transmit data TD been read out of the circular buffer MEM but one twenty-fourth (1/24) of the transmit data TD continuously present, which must be transmitted with the next transmit time slot TX, has already been newly written into the circular buffer MEM by the processor P. These are the transmit data TD drawn (counterclockwise) in front of the pointer P (in FIG. 2, the pointer P is always shown in the position which it has at the beginning of the time slot being considered in each case).

In the second illustration from the left in FIG. 2, the state of the circular buffer MEM during the first receive time slot RX is shown, which follows one half frame length after the transmit time slot TX. In the meantime, the pointer P has rotated further counterclockwise by 20 bytes. During this time, further transmit data TD which have continuously occurred in the meantime have been temporarily stored. Receive data RD received during the receive time slot RX are written into the buffer MEM counterclockwise in front of the pointer P. These also occupy 40 bytes. Since the receive data RD are output continuously at the analog output $O_A$, the receive data RD received first and temporarily stored in the buffer (MEM) are already read out of the buffer MEN again during the same receive time slot RX. The storage location which has become available as a result is immediately occupied with transmit data TD which have newly occurred.

In the next to the last illustration of the buffer MEM in FIG. 2, the pointer P has already traveled two thirds, and thus 40 bytes of the buffer MEM, as compared with its initial position. The next transmit time slot TX is being considered. The 40 bytes of transmit data TD now contained in the buffer MEM are read out of it again for transmission. In the meantime, the transmit data TD have overwritten the receive data RD already read out of it in the buffer MEM.

The last illustration of the buffer MEM in FIG. 2 on the very right applies to the next receive time slot RX in which the transmit data TD sent one half frame length before are overwritten with new receive data RD which are read out of the buffer MEM again during the next 10 ms for a voice output. At the beginning of the second receive time slot RX considered last, the pointer P again points to the first storage location of the circular buffer MEM. The operation of the transmission station S continues in the same manner as long as the data transmission is maintained or there as a change of the transmission time slot.

It is possible to carry out the temporary storage of the B fields of receive time slots and transmit time slots in one common circular buffer in the manner described. Although each B field has a size of 40 bytes, the common circular buffer MEM has a storage capacity of only 60 bytes. In other exemplary embodiments of the invention, it is also possible for the circular buffer MEM to have a greater storage capacity so that the time requirements for writing into it and reading out of it are less. However, the exemplary embodiment being considered has the advantage of needing only a single buffer pointer P for the circular buffer MEM. This is because in the case of a transmit time slot TX, in each case it is the 40 bytes of transmit data TD which are stored behind the position of the counter P that are read out of the buffer MEM and, during a receive time slot RX, 40 bytes of receive data RD are always written into the storage locations of the buffer MEM located in front of the position of the pointer P. In principle, the transmit data TD which are in each case current and are continuously present and to be temporarily stored in the buffer MEM are written into the storage locations to which the pointer P is currently pointing.

Through the use of the circular buffer MEM with a minimum storage capacity of 60 bytes, as explained in accordance with FIG. 2, a change of the transmit time slots TX from the second time slot SL in each case and of the receive time slots RX from the fourteenth time slot in each case to other time slots which, in turn, are offset with respect to one another by one half frame length each, is also possible without problems as can be easily seen. One condition which must be observed with a change of time slots is that after a change of the receive time slot RX, the transmit time slot TX is also immediately changed unless this change has already taken place immediately before. This means that, in principle, an interval of exactly one half frame length must always be maintained between a receive time slot RX and a following transmit time slot TX. Otherwise, there will be losses of data since data located in the buffer MEM which will still be needed later would be overwritten by other data.

We claim:

1. A TDMA data station, comprising:

a pointer; and a circular buffer having time slots with said pointer moving sequentially through said circular buffer, said circular buffer being for storing a B field of transmit data throughout a DECT frame and transmitting the B field of transmit data at a transmit time slot, and for storing a B field of receive data at a receive time slot and reading the B field of receive data throughout the DECT frame; said transmit time slot and said receive time slot being separated in said circular buffer; and said circular buffer being sized less than twice the B field.

2. The TDMA station according to claim 1, including only one pointer.

3. The TDMA station according to claim 1, wherein a first half of said timeslots in said buffer are for storing receive data and a second half of said time slots are for storing transmit data.

4. The TDMA station according to claim 1, wherein the transmit data are stored on one side of said pointer and received data are stored on the other side of said pointer.

5. The TDMA station according to claim 1, wherein said read timeslot and said transmit timeslot are evenly spaced over the DECT frame.

6. The TDMA station according to claim 5, wherein said buffer is one-and-one-half times as large as the B field.

7. The circular buffer according to claim 1, wherein receive data temporarily stored in the circular buffer during a receive time slot are overwritten, in an order in which they have been temporarily stored, by transmit data to be transmitted in a subsequent transmit time slot.

8. The circular buffer according to claim 1, wherein the transmit data and receive data are each user data of one respective B field for a DECT data transmission station.

* * * * *